United States Patent

[11] 3,607,866

| [72] | Inventor | Denis M. Bailey<br>E. Greenbush, N.Y. |
|---|---|---|
| [21] | Appl. No. | 752,770 |
| [22] | Filed | Aug. 15, 1968 |
| [45] | Patented | Sept. 21, 1971 |
| [73] | Assignee | Sterling Drug Inc.<br>New York, N.Y. |

[54] 3,4-DIHYDRO-1H-1,3,4-BENZOTRIA-ZEPINE-2,5-DIONES AND THEIR PREPARATION
22 Claims, No Drawings

[52] U.S. Cl. .................................................. 260/239.3B,
260/471, 260/294.3 A, 260/247.2 A, 260/268
R, 260/239 B, 260/326.3, 424/248, 424/267,
424/250, 424/244, 424/274
[51] Int. Cl. .......................................................... C07d 55/54
[50] Field of Search .......................................... 260/239.3
BI

[56] References Cited
OTHER REFERENCES
Langis et al. " Chimica Therapeutica" Vol. 2, No. 5, (1967) pages 349– 353

*Primary Examiner*—Henry R. Jiles
*Assistant Examiner*—Robert T. Bond
*Attorneys*—Elmer J. Lawson, B. Woodrow Wyatt, Thomas L. Johnson, Robert K. Bair, R. Clifford Bourgeois, William G. Webb and Roger T. Wolfe

ABSTRACT: 1-R'-3-R"-4-R'''-3,4-dihydro-1H-1,3,4-benzotriazepine-2,5-dione where R' is hydrogen, lower-alkyl, lower-alkenyl, halo-(lower-alkenyl), phenyl-(lower-alkyl)-, phenyl, phenyl-O-Y-, B=N—Y— or B=N—COCH$_2$— where Y is polycarbon-lower-alkylene and B=N is lower-tertiary-amino, and R" and R''' are each hydrogen or lower-alkyl, having sedative and anti-inflammatory activities, are prepared by reacting a lower-alkyl N-R'-N-(lower-carbalkoxy)anthranilate with a hydrazine of the formula R"-NHNH-R'''.

3,4-DIHYDRO-1H-1,3,4-BENZOTRIA-ZEPINE-2,5-DIONES AND THEIR PREPARATION

This invention relates to compositions of matter of class of 1,3,4-benzotriazepines.

The invention sought to be patented, in its composition aspect, resides in the class of compounds which I designate 1-R'-3-R''-4-R'''-3,4-dihydro-1H-1,3,4-benzotriazepine-2,5-diones where R', R'' and R''' are defined below. Accordingly, I depict these compounds as having a molecular structure in which a 3,4-dihydro-1H-1,3,4-benzotriazepine-2,5-dione is optionally substituted at the 3- and 4-positions by lower-alkyl, and at the 1-position by lower-alkyl, lower-alkenyl, halo-(lower-alkenyl), phenyl-(lower-alkyl)-, phenyl, phenyl-O-Y-, B=N-Y- or B=N-COCH$_2$- where B=N is lower-tertiary-amino and Y is polycarbon-lower-alkylene.

The invention sought to be patented in its process aspect is described as residing in the process of reacting a lower-alkyl N-R'-N-(lower-carbalkoxy)-anthranilate with a hydrazine of the formula R''-NHNH-R''' to form the said 1-R'-3-R''4-R'''3,4-dihydro-1H-1,3,4-benzotriazepine-2,5-diones of the invention where R', R'' and R''' are defined as below in formula I.

Without limiting the generality of the foregoing, illustrative and preferred embodiments of my 3,4-dihydro-1H-1,3,4-benzotriazepine-2,5-diones are the compounds of formula I

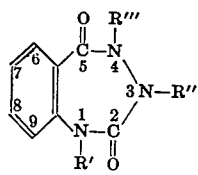

I where R' is hydrogen, lower-alkyl, lower-alkenyl, halo-(lower-alkenyl), phenyl-(lower-alkyl)-, phenyl, phenyl-O-Y-, B=N—Y—or B=N—COCH$_2$—where Y is polycarbon-lower-alkylene and B=N is lower-tertiary-amino, and R' and R''' are each hydrogen or lower-alkyl. Optionally, the benzenoid ring of formula I can be substituted by low-molecular weight substituents, e.g., halo, lower-alkyl, lower-alkoxy, lower-alkylmercapto, lower-alkylsulfonyl, nitro, amino, hydroxy, sulfamoyal, and the like, at any of the available positions, i.e., 6, 7, 8 or 9, and where more than one substituent is present, they can be the same or different and they can be in any of the various position combinations relative to each other. The halo substituents include chloro, bromo, iodo and fluoro. Here and elsewhere throughout this specification, it will be understood the benzene ring of phenyl can bear any number and kind of substituents as would occur to the man skilled in organic chemistry; solely for illustration, and without limiting the generality of the foregoing, such substituents include lower-alkyl, lower-alkoxy, halo, lower-alkylmercapto, and other low-molecular weight substituents such as those noted above as substituents of the benzenoid ring of formula I, the term "lower" in each instance designating one and six carbon atoms inclusive.

Another composition aspect of the invention are the 2-thioxo analogs of the above 2,5-diones of formula I, i.e., the corresponding compounds having S in place of 0 at the 2-position of the benzotriazepine ring. These 2-thioxo analogs, named 3,4-dihydro-1-R'-2-thioxo-1H-1,3,4-benzotriazepine-5(4H)-ones, are prepared by the process aspect of the invention using a lower-alkyl N-chlorothiocarbonyl-N-R'-anthranilate instead of a lower-alkyl N-(lower-carbalkoxy)-N-R'-anthranilate.

The tangible embodiments of the composition aspect of the invention possess the inherent general physical properties of being white or pale yellow crystalline solids melting between about 100° C. to about 325° C.; are substantially insoluble in water; and, are of varying solubility in organic solvents, e.g., ether, chloroform, methylene dichloride, dimethylformamide, ethanol, isopropyl alcohol, and the like.

The tangible embodiments of the invention possess the inherent applied use characteristics of exerting pharmacological effects in animal organisms, e.g., anti-inflammatory, psychomotor depressant and barbituate potentiating properties, as evidenced by known pharmacological evaluation procedures, thus indicating their use as anti-inflammatory agents and sedatives.

The term "lower-alkyl," as used herein, e.g., as one of the meanings for R', R'' or R''' in formula I or for R below, is an alkyl radical having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

The term "lower-alkenyl," as used herein, e.g., as one of the meanings for R' in formula I, is an alkenyl radical having from three to six carbon atoms and is illustrated by 2-propenyl (allyl), 2-methyl-2-propenyl, 3-methyl-2-butenyl, 3-butenyl, 2-hexenyl, and the like.

The term "halo-(lower-alkenyl)," as used herein, e.g., as one of the meanings for R' in formula I, is a halo-alkenyl radical having from three to six carbon atoms and from one to two halo substituents (i.e., chloro, bromo, iodo and fluoro, preferably chloro and bromo), and is illustrated by —CH$_2$CH=CHCl, —CH(CH$_3$)CH=CHCl, —CH$_2$CH=CHBr, —CH$_2$CH CHI, —CH$_2$CH=CHF, —CH$_2$C(Cl)=CH$_2$, —CH$_2$C(Cl)=CHCl, —CH$_2$CH$_2$CH=C(Cl)CH$_3$, —CH$_2$CH$_2$C(Cl)=C(Cl)CH$_3$, —CH$_2$CH=C(Cl)$_2$, —CH$_2$CH=C(Br)$_2$, —CH$_2$C(Br)=C(CH$_3$)$_2$, —CH$_2$CH$_2$CH$_2$CH=C(Cl)CH$_3$, and the like.

The term "lower-tertiary-amino," as used herein, e.g., as the meaning for B=N in formula I, preferably is di-(lower-alkyl)amino or saturated-N-heteromonocyclic 5- to 7-membered rings consisting of piperidino, morpholino, pyrrolidino, piperazino, hexamethyleneimino, or lower-alkylated (preferably one to three lower-alkyl groups) derivatives thereof, among which are, for purposes of illustration, dimethylamino, diethylamino ethylmethylamino, di-n-butylamino, di-n-hexylamino, piperidino, 2-methylpiperidino, 3-ethylpiperidino, 2,6-di-methylpiperidino, morpholino, 2-methylmorpholino, pyrrolidino, 2-methylpyrrolidino, 2,5-dimethylpyrrolidino, piperazino, 4-methylpiperazino, 2,4,6-trimethylpiperazino, 2-methylhexamethyleneimino, 2,7-dimethylhexamethyleneimino, and the like.

The term "polycarbon-lower-alkylene," as used herein, e.g., as the meaning for Y in formula I, is an alkylene radical having from two to six carbon atoms and having its connecting linkages on different carbon atoms, including the straight and branched-chain radicals, among which are, for purposes of illustration but without limiting the generality of the foregoing, —CH$_2$CH$_2$—, —CH(CH$_3$)CH$_2$—, —CH$_2$CHCH$_3$, —C(CH$_3$)$_2$CH$_2$—, —CH$_2$CH$_2$CH$_2$—, -, —CH$_2$CHCH$_2$CH$_3$, —CH$_2$CH$_2$CH$_2$CH$_2$b', —CH$_2$CH$_2$CHCH$_3$, —CH$_2$CHCH$_2$CH$_2$CH$_3$, —CH$_2$CHCH$_2$CH$_2$CH$_2$CH$_3$ and —CH$_2$CH$_2$CH$_2$CH$_2$CH$_2$CH$_2$—.

The nature of the starting materials, mode of synthesis results of elementary analyses, examination of the final products by infrared and nuclear magnetic resonance spectrographic analyses, all taken together, confirm the molecular structure assigned to these compounds.

The manner and process of making and using the invention will now be generally described so as to enable a person skilled in the art of chemistry to make and use the same as follows:

The intermediate lower-alkyl N-R'-N-(lower-carbalkoxy)-anthranilates, as well as the intermediate hydrazines of the formula R''-NHNH-R''', are generally known compounds and are prepared by generally known methods, as illustrated hereinbelow. For example, the lower-alkyl N-R'-N-(lower-carbalkoxy)-anthranilates are conveniently prepared by reacting a lower-alkyl anthranilate with a lower-alkyl chloroformate, as illustrated hereinbelow by example B-1 to B-13 inclusive. In turn, the starting lower-alkyl anthranilates are prepared by various known methods, as illustrated by example A-1 to A-4 inclusive. Also, the lower-alkyl N-R'-N-(lower-carbalkoxy)-anthranilates are prepared by reacting a lower-alkyl N-(lower-carbalkoxy)-anthranilate as its N-sodium salt (formed by reaction with sodium hydride) with an R'-halide, as illustrated below by example C–1 to C–16 inclusive; the starting materials used in this known method are commercially available, known or readily obtained by known procedures, as illustrated below by example B–1 to B–13 inclusive.

The intermediate lower-alkyl N-chlorothiocarbonyl-N-R'-anthranilates, which are used in the preparation of the 2-thioxo final products are readily prepared by the generally known procedure of reacting a lower-alkyl N-R'-anthranilate with thiophosgene, as illustrated below by example B–14.

The final products, as illustrated by formula I, are prepared by reacting a lower-alkyl N-R'-N-(carbalkoxy)-anthranilate with a hydrazine of the formula R''-NHNH-R''' where R', R'' and R''' have the meanings given above for formula I. The reaction is carried out preferably by heating the reactants in a suitable solvent, for example, a lower-alkanol, preferably isopropyl alcohol, ethanol, methanol and n-butanol. The reaction can be run at temperatures between about 50° to 150° C., preferably about 60° to 100° C. Alternatively, the compounds where R''=R''' and are each lower-alkyl can be prepared by reacting the corresponding compounds where R'' and R''' are each hydrogen with a lower-alkyl halide or sulfate, as illustrated by example D–31.

The 2-thioxo final products are prepared by reacting a lower-alkyl N-R'-N-chlorothiocarbonyl-anthranilate with a hydrazine of the formula R''-NHNH-R'''. Preferably, the reactants are cautiously mixed and then gently warmed at about 50°–125° C., preferably about 80°–100° C.

The best mode contemplated for carrying out the invention will now be set forth as follows:

A. ALKYL N-R'-ANTHRANILATES

The following preparations illustrate various known methods of preparing the intermediate lower-alkyl N-R'-anthranilates where R' is defined as in formula I above:

1. Methyl N-n-butyl-5-nitroanthranilate— A stirred mixture containing 100 g. of methyl 2-chloro-5-nitrobenzoate, 132 ml. of n-butylamine and 700 ml. of tetrahydrofuran was refluxed for 5 hours, cooled and filtered. The filtrate was heated in vacuo to remove the solvent and excess amine and the residual material was triturated in the cold with 100 ml. of n-pentane. The solvent was collected and triturated with a cold mixture of four parts of methanol to one part of water (v/v) and then recrystallized from n-hexane to yield 81 g. of methyl N-n-butyl-5-nitroanthranilate, m.p. 62°–64° C.

Following the above-described procedure of example A–1 using corresponding molar equivalent quantities of the appropriate lower-alkylamine in place of n-butylamine, the following compounds were prepared: methyl 5-nitro-N-n-propylanthranilate, m.p. 77°–78° C.; methyl N-isobutyl-5-nitroanthranilate, m.p. 83°–84° C.; and, methyl N-ethyl-5-nitroanthranilate, m.p. 118° C.

2. Methyl N-methyl-5-nitroanthranilate— A 44.4 g. portion of 6-nitro-N-methylisatoic anhydride was gently warmed with a solution containing 0.4 g. of sodium hydroxide in 100 ml. of methanol. Since the evolution of carbon dioxide was slow, another 100 m. of methanol and a pellet of sodium hydroxide was added and the mixture was refluxed for 30 minutes and cooled. The precipitate was collected and washed with cold methanol to yield 38.0 g. methyl N-methyl-5-nitroanthranilate, m.p. 144°–146° C.

3. Methyl 5-bromo-N-methylanthranilate— To a solution containing 8.25 g. of methyl N-methylanthranilate in 100 ml. of chloroform chilled in an ice bath was added a solution of 8.0 g. of bromine in 50 ml. of chloroform. The decolorization was very rapid with no significant temperature rise. The reaction mixture was evaporated in vacuo to remove the chloroform and the remaining solid was crystallized from isopropyl alcohol and dried at 60° C. in vacuo to yield 10.5 g. of methyl 5-bromo-N-methylanthranilate as its hydrobromide, m.p. 147°–148° C. with decomposition.

4. Methyl 4-chloro-N-phenylanthranilate— Into a suspension of 92.4 g. of 4-chloro-N-phenylanthranilic acid suspended in 500 m. of anhydrous methanol was bubbled hydrogen chloride gas for about 3 hours. The reaction mixture was then refluxed on a steam bath for 16 hours and allowed to stand a room temperature over the weekend. The solvent was then removed by distilling in vacuo and the residue was taken up with a mixture of 300 ml. of benzene and about 250 m. of 5 percent aqueous sodium hydroxide. The organic layer was separated and washed with five 100 ml. portions of 5 aqueous sodium hydroxide solution, dried over anhydrous sodium sulfate and filtered through anhydrous sodium sulfate. The filtrate was treated with decolorizing charcoal, the mixture filtered through infusorial earth and the filtrate heated on a steam bath in vacuo to remove the solvent. The remaining oil became crystalline and was recrystallized from n-hexane using decolorizing charcoal and dried in vacuo at 40° C. for 2 hours to yield 65.8 g. of methyl 4-chloro-N-phenylanthranilate, m.p. 59.5°–60.5° C.

Following the procedure described in example A–4 using the appropriate anthranilic acid derivatives in place of 4-chloro-N-phenylanthranilic acid and either methanol or ethanol as the esterifying alcohol, the following methyl or ethyl anthranilates are prepared: ethyl N-ethyl-3-methylanthranilate, methyl 5,N-dimethylanthranilate, methyl 6-bromoanthranilate, ethyl 4-methoxy-N-phenylanthranilate, methyl 4-ethoxyanthranilate, methyl N-ethyl-5-iodoanthranilate, ethyl 5-hydroxyanthranilate, methyl 3-methoxy-N-methylanthranilate, methyl 4-chloro-N-(o-tolyl)anthranilate and methyl 6-nitroanthranilate.

B. ALKYL N-CARBALKOXYANTHRANILATES FROM ALKYL ANTHRANILATES

The following preparations illustrate the generally known method of preparing lower-alkyl N-carbalkoxyanhranilates by reacting a lower-alkyl anthranilate with a lower-alkyl chloroformate.

1. Methyl N-carbomethoxyanthranilate— To 50 g. of methyl anthranilate dissolved in 250 ml. pyridine kept below 20° C. was added dropwise 50 g. of methyl chloroformate and the reaction mixture was allowed to stand for about 16 hours. The liquid was removed under reduced pressure and the residue taken up with a mixture of ether and water. After separating the ether and water layers, the latter was extracted once with ether and this ether extract was combined with the ether layer. The combined ether solution was washed successively with three portions of dilute aqueous hydrochloric acid, 10 percent aqueous sodium bicarbonate and brine. The ether solution was dried over anhydrous potassium carbonate and then evaporated in vacuo to yield 48.0 g. methyl N-carbomethoxyanthranilate, m.p. 60°–63° C.

2. Methyl N-carbomethoxy-5-chloroanthranilate, m.p. 124°–128° C., 77 g., was prepared as in example B–1 using 70 g. of methyl 5-chloroanthranilate, 60 g. of methyl chloroformate, 500 ml. of pyridine and recrystallization from benzene-n-hexane.

3. Methyl N-carbethoxy-5-nitroanthranilate— A mixture containing 9.8 g. of methyl 5-nitroanthranilate and 45 ml. ethyl chloroformate was stirred at reflux for about 16 hours and then evaporated in vacuo to remove the excess ethyl chloroformate. The remaining solid was recrystallized from isopropyl alcohol to yield 11.3 g. of methyl N-carbethoxy-5-nitroanthranilate, m.p. 143.5°–144° C.

4. Methyl N-carbethoxy-N-methyl-5-nitroanthranilate, as an oil, was obtained as in example B–3 using 10.5 g. of methyl N-methyl-5-nitroanthranilate and 25 ml. of ethyl chloroformate. This intermediate product was used in example D–5 without further purification.

5. Methyl N-carbomethoxy-5-chloro-N-methylanthranilate, as an oil, was prepared as in example B–3 using 92.4 g. of methyl 5-chloro-N-methylanthranilate, 100 ml. of methyl chloroformate and a reflux period of 24 hours.

6. Methyl N-carbethoxy-4-chloro-N-methylanthranilate, as an oil, was prepared as in example B-3 using 12.3 g. of methyl 4-chloro-N-methylanthranilate and 48.4 ml. of ethyl chloroformate.

7. Methyl N-carbethoxy-N-methylanthranilate, b.p. 95°–104bL C. at 0.12–0.20 mm., 21.0 g., was prepared as in example B-3 using 16.5 g. of methyl N-methylanthranilate and 20 ml. of ethyl chloroformate.

8. Methyl 5-bromo-N-carbomethoxy-N-methylanthranilate, as an oil, 9.4 g., was prepared as in Example B-3 using 10.0 g. of methyl 5-bromo-N-methylanthranilate hydrobromide and 50 ml. of methyl chloroformate.

9. Methyl N-n-butyl-N-carbomethoxy-5-nitroanthranilate, as an oil, 50 g., was prepared as in Example B-3 using 40 g. of methyl N-n-butyl-5-nitroanthranilate, 280 ml. of methyl chloroformate and a reflux period of 48 hours.

10. Methyl N-carbomethoxy-5-nitro-N-n-propylanthranilate, as an oil, 45.3 g., was prepared as in example B-9 using 36 g. of methyl 5-nitro-N-n-propylanthranilate and 290 ml. of methyl chloroformate.

11. Methyl N-carbomethoxy-N-ethyl-5-nitroanthranilate, as an oil, 44.2 g., was prepared as in example B-9 using methyl N-ethyl-5-nitroanthranilate and 250 ml. of methyl chloroformate.

12. Methyl N-carbomethoxy-N-isobutyl-5-nitroanthranilate, as an oil, 42.0 g., was prepared as in Example B-9 using 35 g. of methyl N-isobutyl-5-nitroanthranilate and 280 ml. of methyl chloroformate.

13. Methyl N-carbethoxy-4-chloro-N-phenylanthranilate, m.p. 106°–107.5° C., 12.0 g., was prepared as in example B-3 using 10.0 g. of methyl 3-chloro-N-phenylanthranilate, 25 ml. of ethyl chloroformate, a reflux period of 3 days (over the weekend) and trituration of the oily product with n-hexane.

14. Methyl N-chlorothiocarbonyl-N-methylanthranilate— To a stirred solution containing 11.5 g. of thiophosgene in 100 ml. of chlorobenzene was added over a 15 minute period a solution containing 16.5 g. of methyl N-methylanthranilate in 25 ml. of chlorobenzene. The reaction mixture was then slowly heated up to reflux for 30 minutes and then heated at reflux for another 80 minutes. The solvent was removed under reduced pressure to leave methyl N-chlorothiocarbonyl-N-methylanthranilate, as a solid which was used in example D-30.

Following the procedure described in example B, e.g., B-1, B-3 or B-9, using the appropriate lower-alkyl anthranilate and methyl or ethyl chloroformate, the following lower-alkyl N-carbalkoxyanthranilates are prepared: ethyl N-carbethoxy-N-ethyl-3-methylanthranilate, methyl N-carbomethoxy-5,N-dimethylanthranilate, methyl 5-bromo-N-carbethoxyanthranilate, methyl 6-bromo-N-carbomethoxyanthranilate, ethyl N-carbomethoxy-N-phenyl-4-methoxyanthranilate, methyl 3,5-dibromo-N-carbethoxyanthranilate, methyl N-carbomethoxy-3,5-dichloroanthranilate, methyl N-carbomethoxy-4-ethoxyanthranilate, methyl N-carbethoxy-N-ethyl-5iodoanthranilate, ethyl N-carbethoxy-5-hydroxyanthranilate, methyl N-carbomethoxy-5-methoxyanthranilate; methyl N-carbethoxy-3-methoxy-N-methylanthranilate, methyl N-carbomethoxy-4-chloro-N-(o-tolyl)anthranilate, methyl N-carbomethoxy-6-nitroanthranilate, methyl N-carbomethoxy-3,5-dimethoxyanthranilate, methyl N-carbomethoxy-4-ethoxy-3-methoxyanthranilate, methyl N-carbomethoxy-5-fluoroanthranilate, methyl N-carbomethoxy-4hydroxyanthranilate, methyl 4-t-butyl-N-carbomethoxyanthranilate, methyl 4-n-butylsulfonyl-N-carbomethoxyanthranilate, methyl N-carbomethoxy-4-chloro-N-(2-phenylethyl)anthranilate, ethyl N-carbethoxy-4-ethylanthranilate, ethyl N-carbethoxy-5-ethyl-mercaptoanthranilate, methyl N-carbomethoxy-4-fluoroanthranilate, methyl N-carbomethoxy-5-isopropyl-4-nitroanthranilate, N-carbomethoxy-5-methylsulfonylanthranilate, methyl N-carbomethoxy-3,4,5-trimethoxyanthranilate, methyl N-carbomethoxy-3,6-dimethoxyanthranilate and methyl N-carbomethoxy-3,6-dimethyl-N-(2,5-xylyl)anthranilate.

C. ALKYL N-R'-N-CARBALKOXYANTHRANILATE FROM ALKYL N-CARBALKOXYANTHRANILATE

The following preparations illustrate the generally known method of preparing N-R'-N-carbalkoxyanthranilate by reacting a lower-alkyl N-carbalkoxyanthranilate as its N-sodium salt (formed by reaction with sodium hydride) with an R'-halide where R' has the meaning given hereinabove for formula I.

1. Methyl N-carbomethoxy-N-ethylanthranilate— A 4.0 g. portion of 54 percent sodium hydride solution in mineral oil was suspended in 25 ml. of dry toluene and the solvent was removed by collecting the sodium hydride through a sintered glass funnel. the sodium hydride was washed with additional toluene and then transferred into the reaction flask with 30 ml. of dry toluene. The resulting suspension was cooled below 10° C. and stirred while 50 ml. dimethylformamide was gradually added, keeping the temperature below 10° C. A solution containing methyl N-carbomethoxyanthranilate in 50 ml. of dimethylformamide was added dropwise at such a rate as to control the gas evolution and to keep the temperature below 10° C. Next, 23.4 g. of ethyl iodide in 70 ml. toluene was added in the same manner. The resulting reaction mixture was then stirred overnight at room temperature; it was then cooled and taken up in 500 ml. of cold water and 200 ml. cold benzene. The two phases were separated and the aqueous layer was extracted with several portions of benzene. The benzene extracts were combined with the benzene layer, and the combined benzene solution was washed with dilute aqueous hydrochloric acid. The "acid wash" was extracted with absolute ether and the ether extract combined with the benzene solution. The combined benzene-ether solution was washed with water, dried over anhydrous sodium sulfate and concentrated in vacuo to remove the solvents, thereby yielding, as an oil, 21.8 g. of methyl N-carbomethoxy-N-ethylanthranilate.

2. Methyl N-carbomethoxy-N-methylanthranilate, 20.7 g. as an oil, was prepared as in example C-1 using 20.9 g. of methyl N-carbomethoxyanthranilate, 9.2 g. of 53 percent sodium hydride in mineral oil and 28.2 g. of methyl iodide.

3. Methyl N-carbomethoxy-N-n-propylanthranilate, 25.1 g. as an oil, was prepared as in example C-1 using 20.9 g. of methyl N-carbomethoxyanthranilate, 28.2 g. of n-propyl bromide and 10.2 g. of 54 percent sodium hydride in mineral oil.

4. Methyl N-n-butyl-N-carbomethoxyanthranilate, 24.1 g. as an oil, was prepared as in example C-1 using 20.9 g. of methyl N-carbomethoxyanthranilate, 20.6 g. of n-butyl bromide and 4.5 g. of 54 percent sodium hydride in mineral oil.

5. Methyl N-n-amyl-N-carbomethoxyanthranilate, 27.8 g. as an oil, was prepared as in example C-1 using 20.9 g. of methyl N-carbomethoxyanthranilate, 22.7 g. of n-amyl bromide and 4.5 g. of 54 percent sodium hydride in mineral oil.

6. Methyl N-allyl-N-carbomethoxyanthranilate, 24.0 g. as an oil, was prepared as in example C-1 using 20.9 g. of methyl N-carbomethoxyanthranilate, 24.2 g. of allyl bromide and 9.2 g. of 53 percent sodium hydride in mineral oil.

7. Methyl N-allyl-5-chloro-N-carbomethoxyanthranilate, 17.5 g. as an oil, was prepared as in example C-1 using 16.7 g. of methyl N-carbomethoxy-5-chloroanthranilate, 12.1 g. of allyl bromide, and 4.4 g. of 54 percent sodium hydride in mineral oil.

8. Methyl N-carbomethoxy-5-chloro-N-(2-methyl-2-propenyl)anthranilate, 19.8 g. as an oil, was prepared as in example C-1 using 16.7 g. of methyl N-carbomethoxy-5chloroanthranilate, 9 g. of 2-methyl-2-propenyl chloride and 4.4 g. of 54 percent sodium hydride in mineral oil.

9. Methyl N-carbomethoxy-N-(2-methyl-2-propenyl)-anthranilate, 23.5 g. as an oil, was prepared as in example C-1 using 20.9 g. of methyl N-carbomethoxyanthranilate, 10.9 g. of 2-methyl-2-propenyl chloride and 4.4 g. of 54 percent sodium hydride in mineral oil.

10. Methyl N-carbomethoxy-N-(2-chloro-2-propenyl)-anthranilate, 26.7 g. as an oil, was prepared as in example C-1 using 20.9 g. of methyl N-carbomethoxyanthranilate, 12.2 g. of 2,3-dichloro-2-propene and 4.4 g. of 54 percent sodium hydride in mineral oil.

11. Methyl N-carbomethoxy-5-chloro-N-(N',N'98 19.2 g., as a gum, was prepared as in example C–1 using 21.0 g. of methyl N-carbomethoxy-5-chloroanthranilate, 12.9 g. of α-chloro-N,N-diethylacetamide and 4.2 g. of 54 percent sodium hydride in mineral oil.

12. Methyl N-carbomethoxy-N-(2-diethylaminoethyl)-anthranilate, 22.9 g. as an oil, was prepared as in example C–1 using 20.9 g. of methyl N-carbomethoxyanthranilate, 13.6 g. of 2-diethylaminoethyl chloride, 4.9 g. of 54 percent sodium hydride in mineral oil and the following workup: The reaction mixture was poured into a mixture containing 500 ml. of cool water and 100 ml. of benzene. The resulting mixture was extracted with four 100 ml. portions of 2.4M hydrochloric acid. The combined acidic extracts were washed with absolute ether. The resulting aqueous solution was made basic by adding 200 ml. of 10 percent aqueous sodium hydroxide. The alkaline aqueous phase was separated and extracted with one 250 ml. portion of benzene and with three 300 ml. portions of chloroform. The combined extracts were dried over anhydrous sodium sulfate, filtered through anhydrous sodium sulfate and the filtrate concentrated in vacuo to remove the organic solvents, thereby yielding the methyl N-carbomethoxy-N-(2-diethylaminoethyl)anthranilate, as an oil.

13. Methyl N-carbomethoxy-N-[2-(1-piperidyl)ethyl]-anthranilate, 28.1 g. as an oil, was prepared as in example C–12 using 20.9 g. of methyl N-carbomethoxyanthranilate, 22 g. of 2-(1-piperidyl)ethyl chloride and 5.8 g. of 54 percent sodium hydride in mineral oil.

14. Methyl N-benzyl-N-carbomethoxy-5-chloro-anthranilate, 16.7 g. as an oil, was prepared as in example C–1 using 24.4 g. of methyl N-carbomethoxy-5-chloroanthranilate, 25.3 g. of benzyl chloride, 9.2 g. of 53 percent sodium hydride in mineral oil and chloroform in the workup instead of benzene.

15. Methyl N-carbomethoxy-N-(4-chlorobenzyl)anthranilate, 35.6 g. as an oil, was prepared as in example C–1 using 20.9 g. of methyl N-carbomethoxyanthranilate, 24.2 g. of 4-chlorobenyl chloride and 4.0 g. of 54 percent sodium hydride in mineral oil.

16. Methyl N-carbomethoxy-N-(2-phenoxyethyl)-anthranilate — 4.4 g. of 54 percent sodium hydride in mineral oil was suspended in 50 ml. of dimethylformamide below 10° C. and 20.9 g. of methyl N-carbomethoxyanthranilate in 50 ml. of dimethylformamide was added with stirring to said suspension. The mixture was stirred for an additional 20 minutes and to it was then added a solution containing 15.7 g. of 2-phenoxyethyl chloride in 30 ml. of dry toluene, while keeping the reaction mixture in an ice bath. The ice bath was then removed and the mixture stirred at room temperature overnight. The reaction mixture was next heated for 24 hours on a steam bath and allowed to stand at room temperature for two days. The mixture was poured into 500 ml. of water and the product extracted with benzene. The extract was washed successively with water, dilute hydrochloric acid, sodium bicarbonate solution and water. It was then dried over anhydrous sodium sulfate and evaporated in vacuo to remove the solvent. The remaining 29 g. of thick oil was purified chromatographically using 1.2 kg. of silica gel and 1:9 ether:chloroform as the eluant to yield 20.1 g. as an oil.

17. Methyl 5-amino-N-carbethoxy-N-methylanthranilate — A mixture containing 50 g. of methyl N-carbethoxy-N-methyl-5-nitroanthranilate, 0.6 g. of platinum dioxide and 100 ml. of ethanol was catalytically hydrogenated. The reaction mixture was filtered to remove the catalyst and the filtrate evaporated to remove the solvent. The residue was recrystallized from isopropyl alcohol and dried at 50° C. and 20 mm. to yield 30.5 G. of methyl 5-amino-N-carbethoxy-N-methylanthranilate, m.p. 85.5°–90° C. A sample was recrystallized again from isopropyl alcohol and dried at 50° C. and 20 mm. and found to melt at 92°–92.2° C.

Following the procedure described in example C, e.g., C–1, C–12 or C–16, using the appropriate lower-alkyl N-carbalkoxyanthranilate and the appropriate R'-halide, the following lower-alkyl N-R'-N-carbalkoxyanthranilates are prepared: methyl N-carbomethoxy-5-chloro-N-ethyl-3-nitroanthranilate, methyl 5-bromo-N-carbmethoxy-N-n-hexylanthranilate, methyl 6-bromo-N-carbomethoxy-(2,3-dichloro-2-propenyl)anthranilate, methyl 3,5-dibromo-N-carbethoxy-N-(3-phenylpropyl)-anthranilate, methyl N-carbomethoxy-3,5-dichloro-N-(4-dimethylaminobutyl)anthranilate, methyl N-carbomethoxy-4-ethoxy-N-[2-(2,5-dimethylpyrolidino)ethyl]anthranilate, methyl N-carbomethoxy-N-[3-(hexamethyleneimino)propyl]g-5-methoxyanthranilate, methyl N-carbomethoxy-N-methyl-6-nitroanthranilate, methyl N-carbomethoxy-N-(2-diethylaminoethyl)-3,5-dimethoxyanthranilate, methyl N-allyl-N-carbomethoxy-4-ethoxy-3-methoxyanthranilate, methyl N-carbomethoxy-5-fluoro-N-methylanthranilate, methyl 4-t-butyl-N-carbomethoxy-N-ethylanthranilate, methyl 4-n-butylsulfonyl-N-carbomethoxy-N-ethylanthranilate, ethyl N-carbethoxy-4,N-diethylanthranilate, ethyl N-carbethoxy-5-ethylmercapto-N-methylanthranilate, methyl N-carbomethoxy-4-fluoro-N-n-propylanthranilate, methyl N-carbomethoxy-5-isopropyl--N-methyl-4-nitroanthranilate, methyl N-carbomethoxy-N-methyl-5-methylsulfonylanthranilate, methyl N-carbomethoxy-N-ethyl-3,4,5-trimethoxyanthranilate and methyl N-carbomethoxy-3,6-dimethoxy-N-methylanthranilate, D. 3,4-DIHYDRO-1H-1,3,4-BENZOTRIAZEPINE-2,5-DIONES 1. 3,4-Dihydro-1H-1,3,4-benzotriazepine-2,5-dione—To a solution containing 48 g. of methyl N-carbomethoxy-anthranilate in 300 ml. of absolute ethanol was added 100 ml. of hydrazine hydrate with swirling until homogeneous. After 15 minutes, the mixture contained a heavy precipitate. The reaction mixture was refluxed for 16 hours, cooled to room temperature and filtered to collect the precipitated product. The precipitate was recrystallized twice from dimethylformamide to yield 27.5 g. of 3,4-dihydro-1H-1,3,4-benzotriazepine-2,5-dione, m.p. 294.2–299.0°C C. (corr.).

2. 7-Chloro-3,4-dihydro-1H-1,3,4-benzotriazepine-2,5-dione, m.p. 307.0°–317.0° C., 8.6 g., was prepared as in example D–1 using 23.1 g. of methyl N-carbomethoxy-5-chloroanthranilate, 40 ml. of hydrazine hydrate, 150 ml. of ethanol and three recrystallizations from dimethylformamide.

3. 3,4-Dihydro-1-methyl-1H-1,3,4-benzotriazepine-2,5-dione, m.p. 244.8°–246.0 C. (corr.), 10.2 g., was prepared as in example D–1 using 20.7 g. of methyl N-carbomethoxy-N-methylanthranilate, 50 ml. of hydrazine hydrate, 150 ml. of ethanol, a reflux period of 2 hours and one recrystallization from dimethylformamide.

4. 3,4-Dihydro-1-n-propyl-1H-1,3,4-benzotriazepine-2,5-dione, m.p. 158.8°–161.0° C. (corr.), 6.5 g., was prepared as in example D–1 using 25.1 g. of methyl N-carbomethoxy-N-n-propylanthranilate, 15 ml. of anhydrous hydrazine, 150 ml. of isopropyl alcohol, a reflux period of 16 hours with stirring and the following workup. Half of the isopropyl alcohol was distilled off, the remaining solution allowed to cool, and the precipitated crystalline product was collected, washed with cold isopropyl alcohol and dried in vacuo at 55° C. overnight.

5. 3,4-Dihydro-1-methyl-7-nitro-1H-1,3,4-benzotriazepine-2,5-dione—A mixture containing the methyl N-carbethoxy-N-methyl-5-nitroanthranilate from example B–4, 10 ml. of 95 percent hydrazine and 75 ml. of isopropyl alcohol was refluxed for 1 hour and allowed to stand at room temperature overnight. The precipitated product was collected, washed with cold isopropyl alcohol and water, recrystallized from dimethylformamide containing a few milliliters of acetic acid and dried at 50° C. and 20 mm. to yield 5.4 g. of 3,4-dihydro-1-methyl-7-nitro-1H-1,3,4-benzotriazepine-2,5-dione, m.p. 233.0°–234.5° C. (corr.).

6. 1-n-Butyl-3,4-dihydro-1H-1,3,4-benzotriazepine-2,5-dione, m.p. 106.8°–109.6° C. (corr.), 7.0 g., was prepared as in example D–4 using 24.1 g. of methyl N-carbomethoxy-N-n-butylanthranilate, 15 ml. of anhydrous hydrazine, 130 ml. of isopropyl alcohol and recrystallization from isopropyl alcohol.

7. 7-chloro-3,4-dihydro-1-methyl-1H-1,3,4-benzotriazepine-2,5-dione, m.p. 207.0°–209.4° C. (corr.), 98.5 g., was prepared as in example D–4 using 119.2 g. of methyl N-carbomethoxy-5-chloro-N-methylanthranilate, 99 ml. of anhydrous hydrazine, 400 ml. of isopropyl alcohol and a reflux period of 90 minutes. The product which separated from the cooled reaction mixture was collected, air-dried and found to analyze satisfactorily without any recrystallization.

8. -Ethyl-3,4-dihydro-1H-1,3,4-benzotriazepine-2,5-dione, m.p. 152.0°–158.0° C. (corr.), 6.3 g., was prepared as in example D–4 using 21.8 g. of methyl N-carbomethoxy-N-ethylanthranilate, 15 ml. of anhydrous hydrazine, 135 ml. of isopropyl alcohol and recrystallizations from isopropyl alcohol and absolute ethanol.

9. 3,4-Dihydro-7-nitro-1H-1,3,4-benzotriazepine-2.5-dione — An 11 g. portion of methyl N-carbethoxy-5nitroanthranilate was dissolved in 600 ml. of boiling methanol. To the solution was added 20 ml. of 95 percent hydrazine. The reaction mixture was refluxed for 4½ hours, and allowed to cool. The precipitated product was collected, washed with isopropyl alcohol, recrystallized from dimethylformamide and dried at 50° C. and 20 mm. to yield 2.5 g. of 3,4-dihydro-7-nitro-1H-1,3,4-benzotriazepine-2,5-dione, m.p. 267.0°–271.0° C. (corr.).

10. 3,4-Dihydro-1-n-pentyl-1H-1,3,4-benzotriazepine-2,5-dione, m.p. 121.0°–123.0° C. (corr.), 7.5 g., was prepared as in example D–4 using 27.8 g. of methyl N-carbomethoxy-N-n-pentylanthranilate, 16.7 ml. anhydrous hydrazine, 400 ml. of isopropyl alcohol and recrystallizations from isopropyl acetate using decolorizing charcoal and isopropyl alcohol using decolorizing charcoal.

11. 7-Amino-3,4-dihydro-1-methyl-1H-1,3,4-benzotriazepine-2,5-dione, — A solution containing 12.6 g. of methyl 5-animo-N-carbethoxy-N-methylanthranilate, 3.4 g. of 95 percent hydrazine and 60 ml. of n-pentanol was refluxed for 2½ hours, the hot solution filtered, and the filtrate allowed to cool. The crystalline precipitate was collected to yield 1.2 g. of the product. To the filtrate was added 20 ml. of 95 percent hydrazine and the resulting solution was refluxed for 3 hours and allowed to cool. The separated solid was collected to yield another 6.4 g. of the product. The combined 7.6 g. of the product was recrystallized from dimethylformamide and dried in vacuo at 50° C. to yield 5.2 g. of 7-amino-3,4-dihydro-1-methyl-1H-1,3,4-benzotriazepine-2,5 -dione, m.p. 238.0°–240.0° C. (corr.).

12. 8-Chloro-3,4-dihydro-1-methyl-1H-1,3,4-benzotriapezine-2,5-dione, m.p. 225°–226° C., 8.8 g., was prepared as in example D–4 using 17.6 g. of methyl N-carbethoxy-5-chloro-N-methylanthranilate, 16.0 g. of anhydrous hydrazine hydrate, 125 ml. of isopropyl alcohol and recrystallizations from methanol and dimethylformamide.

13. 1-n-Butyl-3,4-dihydro-7-nitro-1H-1,3,4-benzotriazepine-2,5-dione, m.p. 117°–118° C., 7.8 g., was prepared as in example D–4 using 50 g. of methyl N-n-butyl-N-carbomethoxy-5-nitroanthranilate, 50 ml. of 95 percent hydrazine, 500 ml. of isopropyl alcohol, three recrystallizations from dimethylformamide containing a small quantity of acetic acid and water, and one recrystallization from isopropyl alcohol.

14. 3,4-Dihydro-7-nitro-1-n-propyl-1H-1,3,4-benzotriazepine-2,5 -dione, m.p. 234° C., 17.1 g., was prepared as in example D–4 using 55 g. of methyl N-carbomethoxy-5-nitro-N-n-propylanthranilate, 56 ml. of 95 percent hydrazine, 550 ml. of isopropyl alcohol and successive recrystallizations from dimethylformamide containing a small amount of acetic acid and water; methanol; and, dimethylformamide containing acetic acid and water.

15. 1-Ethyl-3,4-dihydro-7-nitro-1H-1,3,4-benzotriazepine-2,5-dione, m.p. 175° C., 20.2 g., was prepared as in example D–4 using 44.2 g. of methyl N-carbomethoxy-N-ethyl-5-nitroanthranilate, 43 ml. of 95 percent hydrazine, 440 ml. of isopropyl alcohol, two recrystallizations from dimethylformamide containing small quantities of acetic acid and water, and one recrystallization from acetonitrile.

16. 3,4-Dihydro-1-isobutyl-7-nitro-1H-1,3,4-benzotriazepine-2,5-dione, m.p. 139°–141° C., 13.3 g., was prepared as in example D–4 using 42 g. of methyl N-carbomethoxy-N-isobutyl-5-nitroanthranilate, 43 ml. of 95 percent hydrazine, 420 ml. of isopropyl alcohol, two recrystallizations from dimethylformamide-water and two recrystallizations from isopropyl alcohol.

17. 7-Bromo-3,4-dihydro-1-methyl-1H-1,3,4-benzotriazepine-2,5-dione, m.p. 198.5°–201.0° C., 4.1 g., was prepared as in example D–4 using 9.4 g. of methyl 5-bromo-N-carbomethoxy-N-methyl 10 ml. of 95 percent hydrazine, 25 ml. of isopropyl alcohol and two recrystallizations from dimethylformamide.

18. 1-Allyl-3,4-dihydro-1H-1,3,4-benzotriazepine-2,5-dione, m.p. 134.4°–137.6° C. (corr.), 9.2 g., was prepared as in example D–1 using 24.0 g. of methyl N-allyl-N-carbomethoxyanthranilate, 50.6 g. of anhydrous hydrazine, 150 ml. of absolute ethanol and recrystallization from dimethylformamide.

19. 1-Allyl-7-chloro-3,4-dihydro-1H-1,3,4benzotriazepine-2,5 — A mixture containing 17.5 g. of methyl N-allyl-N-carbomethoxy-7-chloroanthranilate, 25 ml. of hydrazine hydrate and 130 ml. of isopropyl alcohol was refluxed for 16 hours, the reaction solution concentrated to a volume of about 25 ml. and allowed to cool. The crystalline product was collected, washed with cold isopropyl alcohol, recrystallized from isopropyl alcohol and dried overnight at 50° C. and 20 mm. to yield 10.2 g. of 1-allyl-7-chloro-3.4-dihydro-1H-1,3,4,benzotriazepine-2,5-dione, m.p. 131.0°–133.8° C. (corr.).

20. 7-Chloro-2,3-dihydro-1-(2-methyl-2-propenyl)-1H-1,3,4-benzotriazepine-2,5-dione — A mixture containing 19.8 g. of methyl N-carbomethoxy-5-chloro-N-(2-methyl-2-propenyl)anthranilate, 10 ml. of 95 percent hydrazine and 100 ml. of isopropyl alcohol was refluxed for 16 hours and the solvents removed under reduced pressure. The residue was triturated with ether and the solid collected. The solid was recrystallized from isopropyl alcohol and dried overnight at 50° C. and 20 mm. to yield 8.8 g. of 7-chloro-3,4-dihydro-1-(2-methyl-2propenyl-1H-1,3,4,-benzotriazepine-2,5-dione, m.p 136.0°–138.8° C. (corr.).

21. 3,4-Dihydro-1-(2-methyl-2-propenyl)-1H-1,3,4-benzotriazepine-2,5-dione, m.p. 145.0°–154.0° C. (corr.), 7.2 g. was prepared as in example D–4 using 23.5 g. of methyl N-carbomethoxy-N-(2-methyl-2-propenyl)anthranilate, 15 ml. of anhydrous hydrazine hydrate, 130 ml. of isopropyl alcohol and recrystallization from isopropyl alcohol.

22. 1-(2-Chloro-2-propenyl)-3,4-dihydro-1H-1,3,4-benzotriazepine-2,5-dione, m.p. 154°–160° C., 7.0 g., was prepared as in example D–4 using 26.7 g. of methyl N-(2-chloro-2-propenyl)-N-carbomethoxyanthranilate, 15 ml. of 95 percent hydrazine, 100 ml. of isopropyl alcohol and recrystallizations from methanol-isopropyl alcohol and dimethylformamide.

23. 7-Chloro-1-(N',N'-diethylcarbamoylmethyl)3,4-dihydro-1H-1,3,4-benzotriazepine-2,5-dione — A mixture containing 19.2 g. of methyl N-carbomethoxy-5-chloro-N-(N',N'-diethylcarbamoylmethyl)anthranilate, 20 ml. of 95 percent hydrazine and 150 ml. of ethanol was refluxed for 5 hours and cooled. The separated solid was collected and recrystallized from chloroform to yield 6.2 g. of 7-chloro-1(N',N'-diethylcarbamoylmethyl-3,4-dihydro-1H-1,3,4-benzotriazepine-2,5-dione, m.p. 194.0°–196.0° C. (corr.)

24. 1-(2-Diethylaminoethyl)-3,4-dihydro-1H-1,3,4-benzotriazepine-2,5-dione — A mixture containing 22.9 g. of methyl N-carbomethoxy-N-(2-diethylaminoethyl)anthranilate, 15 ml. of anhydrous hydrazine and 130 ml. of absolute ethanol was refluxed for 5 hours. The ethanol was distilled off and about 200 ml. of isopropyl alcohol was added. The resulting solution was concentrated at a volume of about 175 ml. and cooled. The crystalline product was collected, washed with small portions of cold isopropyl alcohol and dried in vacuo at 55° C. to yield 10.9 g. of 1-(2-diethylaminoethyl)-3,4

-dihydro-1H-1,3,4-benzotriazepine-2,5-dione, m.p. 116.0°–118.6° C. (corr.).

25. 3,4-Dihydro-1-[2-(1-piperidyl)ethyl]-1H-1,3,4-benzotriazepine-2,5-dione, m.p. 146.0°–148.0° C. (corr.), 5.3 g., was prepared as in example D-4 using 28.1 g. of methyl N-carbomethoxy-N-[2-(1-piperidyl)ethyl]anthranilate, 27.8 ml. of 95 percent hydrazine, 300 ml. of isopropyl alcohol and recrystallizations from dimethylformamide and isopropyl alcohol with decolorizing charcoal.

26. 1-Benzyl-7-chloro-3,4-dihydro-1H-1,3,4-benzotriazepine-2.5-dione — A mixture containing 16.7 g. of methyl N-benzyl-N-carbomethoxy-5chloroanthranilate, 20 ml. of 95 percent hydrazine and 150 ml. of absolute ethanol was refluxed with stirring for 16 hours and the solvents were distilled off in vacuo. The remaining solid was recrystallized successively from isopropyl alcohol, methanol-isopropyl alcohol using decolorizing charcoal and isopropyl alcohol, and dried overnight at 50° C. and 20 mm. to yield 4.6 g. of 1-benzyl-7-chloro-3,4-dihydro-1H-1,3,4-benzotriazepine-2,5-dione, m.p. 141.6°–143.8° C. (corr.).

27. 1-(4-Chlorobenzyl)-3,4-dihydro-1,3,4- benzotriazepine-2,5-dione, m.p. 202.0°–204.0° C. (corr.), 14.4 g., was prepared as in example D-4 using 33.3 g. of methyl N-carbomethoxy-N-(4 -chlorobenzyl)anthranilate, 16 ml. of anhydrous hydrazine, 140 ml. of isopropyl alcohol and recrystallization from dimethylformamide.

28. 3,4dihydro1-(2-phenoxyethyl)-1H-1,3,4-benzotriazepine-2,5-dione, m.p. 168°–173° C., 6.1 g., was prepared as in example D-4 using 8.5 g. of methyl N-carbomethoxy-N- (2-phenoxyethyl)anthranilate, 10 ml. of hydrazine hydrate, 100 ml. of isopropyl alcohol and two recrystallizations from dimethylformamide.

29. 8-Chloro- 3,4-dihydro- 1-phenyl- H-1,3,4-benzotriazepine- 2.5-dione, m.p. 217–218°–218° C., 4.6 g., was prepared as in example D-4 using 12.0 g. of methyl N-carbethoxy-4 -chloro-N-phenylanthranilate, 100 ml. of anhydrous hydrazine and 100 ml. of isopropyl alcohol.

30. 3,4-Dihydro- 1-methyl- 2-thioxo- 1H-1,3,4-benzotriazepin- 5 (4H)-one

To the sample of methyl N-chlorothio-carbonyl-N-methylanthranilate prepared in example B-14 was added cautiously 50 ml. of 95 percent hydrazine and the mixture was warmed on a steam bath for 30 minutes. Isopropyl alcohol was added to the reaction mixture and the solid was collected, washed with isopropyl alcohol, dried in vacuo at 60° C. and recrystallized twice from dimethylformamide to yield 2.0 g. of 3,4-dihydro- 1-methyl- 2-thioxo-1H- 1,3,4-benzotriazenpin-5(4H)-one, m.p. 264–266° C.

31. 7-Chloro-3,4-dihydro-1,3,4-trimethyl-1H-1,3,4-benzotriazepine-2,5-dione

A mixture containing 5.0 g. of 7-chloro- 3,4-dihydro-1-methyl-11,3,4-benzotriazepine-2,5-dione, 25 ml. of dimethyl sulfate and 1 ml. of water was heated on a steam bath for 5 hours, cooled to about 40° C. and then poured into a mixture of ice and water. The resulting mixture was stirred for about 20 minutes and the separated solid was collected (2.9 g.). To the filtrate was added solid potassium carbonate to a pH of about 8 followed by acetic acid to a pH of about 6 and the mixture was stirred for 30 minutes. The separated solid was collected (1.0 g.) and the combined solids (3.9 g.) were recrystallized twice from isopropyl alcohol to yield 7-chloro- 3,4-dihydro- 1,3,4-trimethyl-1H-1,3,4-benzotriazepine-2,5-dione, m.p. 157–158.5° C.

32. 7-Chlorosulfonyl-3,4-dihydro-1-methyl-1H-1,3,4-benzotriazepine-2,5-dione - To 5.0 g. of 3,4-dihydro- 1-methyl-1H-1H-1,3,4-benzotriazepine-2,5-dione was added 25 ml. of chlorosulfonic acid and the resulting mixture was heated on a steam bath for 2 hours and then poured onto ice. The separated solid was collected, washed with cold water and dried in vacuo at room temperature over phosphorus pentoxide to yield 6.3 g. of 7-chlorosulfonyl-3,4-dihydro-1-methyl-1H- 1,3,4-benzotriazepine-2,5-dione, m.p. 295°–300° C. with decomposition.

33. 3,4-Dihydro-1-methyl-7-sulfamoyl-1H- 1,3,4-benzotriazepine-2,5-dione

To a suspension of 5.3 g. of 7-chlorosulfonyl-3,4-dihydro-1-methyl-1H-1,3,4-benzotriazepine- 2,5-dione in 50 ml. of acetonitrile was added with swirling 50 ml. of concentrated ammonium hydroxide. After about 10 minutes, the separated solid was collected, washed successively with cold 1:1 acetonitrile -water and acetonitrile, dried in vacuo at 60° C., recrystallized in vacuo at 60° C. to yield 1.9 g. of 3,4-dihydro-1methyl-7-sulfomoyl-1H-1,3,4-benzotriazepine-2,5-dione, m.p. 274°–277.5° C.

Following the procedure described in example D, e.g., D-1, D-4 or D-24, using the appropriate lower-alkyl N-carbalkoxy-N-R'-anthranilate and hydrazine of the formula R'''-NHNH-R''' where R', R'' and R''' are each defined as in formula I above, the following 1-R'-3,4-dihydro-1H-1,3,4-benzotriazepine-2,5-diones are prepared: 1,3,4-triethyl-3,4-dihydro-9-methyl-1H-1,3,4-benzotriazepine-2,5-dione, 3,4-dihydro-1,7-dimethyl-1H-1,3,4-benzotriazepine-2,5-dione, 7-bromo-3,4-dihydro-3,4-di-n-propyl-1H-1,3,4-benzotriazepine-2,5-dione, 6-bromo-3,4-dihydro-1H-1,3,4-benzotriazepine-2,5-dione, 3,4-dihydro-8-methoxy-1-phenyl-1H-1,3,4-benzotriazepine-2,5-dione, a mixture of 7,9-dibromo-4-ethyl-3,4-dihydro-3-methyl-1H-1,3,4-benzotriazepine-2,5-dione and 7,9-dibromo-3-ethyl-3,4-dihydro-4-methyl-1H-1,3,4-benzotriazepine-2,5-dione (using 1-ethyl-2-methylhydrazine), 7,9-dichloro-3,4-dihydro-1H-1,3,4-benzotriazepine-2,5-dione, 8-ethoxy-3,4-dihydro-1H-1,3,4-benzotriazepine-2,5-dione, 1-ethyl-3,4-dihydro-7-iodo-1H-1,3,4-benzotriazepine-2,5-dione, 7-hydroxy-3,4-dihydro-1H-1,3,4benzotriazepine-2,5-dione, 3,4-dihydro-7-methoxy-1H-1,3,4-benzotriazepine-2,5-dione, 3,4-di-n-butyl-3,4-dihydro-9-methoxy-1-methyl-1H-1,3,4-benzotriazepine-2,5-dione, 8-chloro-3,4-dihydro-1-(o-tolyl)-1H-1,3,4-benzotriazepine-2,5-dione, 3,4-dihydro-6-nitro-1H-1,3,4-benzotriazepine-2,5-dione, 8-methyl-3,4-dihydro-1H-1,3,4-benzotriazepine-2,5-dione, 3,4-dihydro-7,9-dimethoxy-1H-1,3,4-benzotriazepine-2,5-dione, 8-ethoxy-3,4-dihydro-9-methoxy-1H-1,3,4-benzotriazepine-2,5-dione, 7-fluoro-3,4-dihydro-1H-1,3,4-benzotriazepine-2,5-dione, 3,4-dihydro-8-hydroxy-1H-1,3,4-benzotriazepine-2,5-dione, 8n-butylsulfonyl-3,4-dihydro-1H-1,3,4-benzotriazepine-2,5-dione, 7-ethylmercapto-3,4-dihydro-1H-1,3,4-benzotriazepine-2,5-dione, 3,4-dihydro-7-isopropyl-8-nitro-1H-1,3,4-benzotriazepine-2,5 -dione, 3,4-dihydro-7,8,9-trimethoxy-1H-1,3,4-benzotriazepine-2,5-dione, 3,4-dihydro-6,9-dimethoxy-1H-1,3,4-benzotriazepine-2,5-dione, 7-chloro-1-ethyl-3,4-dihydro-9-nitro-1H-1,3,4-benotriazepine-2,5-dione, 8-chloro-3,4-dihydro-1-methyl-7-sulfamoyl-1H-1,3,4-benotriazepine-2,5-dione, 7-bromo-1,3,4-tri-n-hexyl-3,4-dihydro-1H 1,3,4-benzotriazepine-2,5-dione, 6-bromo-1-(2,3-dichloro-2-propenyl)-3,4-dihydro-3,4-dimethyl-1H-1,3,4-benzotriazepine-2,5-dione, 7,9-dibromo-3,4-dihydro-1-(3-phenylpropyl)-1H-1,3,4 -benzotriazepine-2,5-dione, 7,9-dichloro-3,4-dihydro-1-(4-dimethylaminobutyl)-1H-1,3,4-benzotriazepine-2,5-dione, 8-ethoxy-3,4-dihydro-1-[2-(2,5-dimethyl-pyrrolidino)ethyl]-1H-1,3,4-benzotriazepine-2,5-dione, 1-[3-(hexamethyleneimino)propyl]-3,4-dihydro-7-methoxy-1H-1,3,4-benzotriazepine-2,5-dione, 3,4-dihydro-1-methyl-6-nitro-1H-1,3,4-benzotriazepine-2,5-dione, 1-(2-diethylaminoethyl)-3,4 -dihydro-7,9-dimethoxy-1H-1,3,4-benzotriazepine-2,5-dione, 1-allyl-8-ethoxy-3,4-dihydro-9-methoxy-1H-1,3,4-benzotriazepine-2,5-dione, 7-fluoro-3,4-dihydro-1-methyl-1H-1,3,4-benzotriazepine-2,5-dione, 8-t-butyl-1-ethyl-3,4-dihydro-1H-1,3,4-benzotriazepine-2,5-dione, 8-n-butylsulfonyl-1-ethyl-3,4-dihydro-1H-1,3,4-benzotriazepine-2,5-dione, 1,8-diethyl-3,4-dihydro-1H-1,3,4-benzotriazepine-2,5-dione, 7-ethylmercapto-3,4-dihydro-1-methyl-1H-1,3,4-benzotriazepine-2,5-dione, 3,4-diethyl-8-fluoro-3,4-dihydro-1-n-propyl-1H-1,3,4-benzotriazepine-2,5-dione, 3,4-dihydro-7-isopropyl-1-methyl-8-nitro-1H-1,3,4-benzotriazepine-2,5-dione, 3,4-dihydro-1-methyl-7-methylsulfonyl-1H-1,3,4-benzotriazepine-2,5-dione, 1-ethyl-3,4-dihydro-7,8,9- trimethoxy-1H-1,3,4-benzotriazepine-2,5-dione and 3,4-dihydro-6,9-dimethoxy-1-methyl-1H-1,3,4-benzotriazepine-2,5-dione.

The al. activity of the 3,4-dihydro-1H-1,3,4-benotriazepine-2,5-diones of the invention was measured by the inhibition of carrageenin-induced local foot edema in fasted rats generally according to the procedure of C. A. Winter et al., Proc. Soc. Exptl. & Med. 111, 544 –547 (1962) as follows: Food is withdrawn from male albino rats, weighing approximately 110–124 gms., 18 hours prior to a single oral medication of the test compound. Each compound is administered to at least five rats. One hour following the medication, 0.05 ml. of 1 percent aqueous suspension of carrageenin is injected into the plantar tissue of the right hind foot. Three hours after injections, the rats are sacrificed and the hind feet cut off at the tibiocalcaneo-talar joint for subsequent weighing. The observed difference between the average edema weight of the control and medicated rats is expressed as percent inhibition of edema. When tested by the above-described procedure, the compounds of the invention were found to inhibit local edema due to carrageenin-induced inflammation when administered at oral dose levels between about 10 and 200 mg./kg.

The barbiturate potentiation activity of the 3,4-dihydro-1H-1,3,4-benzotriazepine-2,5-diones of the invention was measured in mice generally according to the standard procedure of Wylie, Proc. Soc. Exp. Biol. Med. 98, 716 (1958) as follows: Groups of 10 mice each are medicated (10 and 100 mg./kg. intraperitoneally or orally) and 40 or 90 minutes later injected with sodium hexobarbital (40 mg./kg. intraperitoneally). Loss or righting reflex of each animal is checked at 10, 15 and 20 minutes after injection of sodium hexobarbital. Test compounds active at 100 and/or 10 mg./kg. are tested at other doses for calculation of an $ED_{50}$, i.e., the effective dose required to produce 50 percent potentiation of sodium hexobarbital. When tested by this procedure, the compounds of the invention were found to have $ED_{50}$ values of about 40 to 200 mg./kg.

The psychomotor depressant activity of the compounds of the invention was measured in mice generally according to the standard procedure of Dews, Brit. J. Pharmacol. 8, 46–48 (1953), as follows: Two or more groups of four mice each are medicated 30 minutes before being placed in a photocell activity cage. The digital counter is set for recording the number of times that the beam of light impinging on the photocell is broken during the 30-minute test period. The tested compound is considered active as a depressant when the total count decrease is 50 percent or greater at the dose tested. When tested by this procedure, the compounds of the invention were found to have depressant activity at dose levels between about 10 and 300 mg./kg.

The actual determination of the numerical biological data definitive for a particular compound is readily obtained by standard test procedures, referred to above, by technicians versed in pharmacological test procedures, without any need for any extensive experimentation.

The 3,4-dihydro-1H-1,3,4-benzotriazepine-2,5-diones can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; by incorporating them in unit dosage form as tablets or capsules for oral administration either alone or in combination with conventional adjuvants, e.g., calcium carbonate, starch, lactose, talc, magnesium stearate, gum acacia, and the like. Optionally, the compounds of the invention can be used in combination with conventional antiinflammatory or sedative agents.

The subject matter which I regard as my invention is particularly pointed out and distinctly claimed as follows:

1. 1-R'-3-R''-4-R'''-3,4-dihydro-1H-1,3,4-benzotriazepine-2,5-dione of the formula

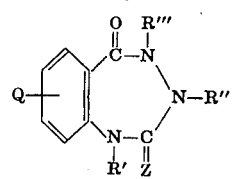

where R' is hydrogen, lower-alkyl, lower-alkenyl, halo-(lower-alkenyl), phenyl-(lower-alkyl)-, phenyl, phenyl-O-Y-, B N-Y-, or B N-COCH₂ where Y is polycarbon-lower-alkylene and B N is piperidino, morpholino, pyrrolidino, piperazino, hexamethyleneimino or lower-alkylated derivatives thereof, R'' and R''' are each hydrogen or lower-alkyl, Q represents hydrogen or from one to three substituents selected from halo, lower-alkyl, lower-alkoxy, lower-alkylmercapto, lower-alkylsulfonyl, nitro, amino, hydroxy and sulfamoyl, and Z is O or S, provided where R' is phenyl that at least one of Q, R'' and R''' is other than hydrogen.

2. A compound according to claim 1 in which R''=R'''= hydrogen and R' is lower-alkyl.

3. A compound according to claim 1 in which R''=R'''= hydrogen and R' is lower-alkenyl.

4. A compound according to claim 1 in which R', R'' and R''' are defined as in claim 1 and the benzo portion of the benzotriazepine nucleus is substituted by halo.

5. A compound according to claim 1 in which R', R'' and R''' are defined as in claim 1 and the benzo portion of the benzotriazepine nucleus is substituted by nitro.

6. A compound according to claim 2 in which R' is methyl.

7. A compound according to claim 3 in which R' is allyl.

8. A compound according to claim 3 in which R' is 2-methyl-2-propenyl.

9. A compound according to claim 2 in which R' is methyl and the benzotriazepine nucleus is substituted at its 7-position by nitro.

10. A compound according to claim 2 in which R' is methyl and the benzotriazepine nucleus is substituted at its 7-position by chloro.

11. A compound according to claim 2 in which R' is methyl and the benzotriazepine nucleus is substituted at its 7-position by bromo.

12. A process for the preparation of a compound according to claim 1 where Z is O which comprises treating at a temperature in the approximate range of 50°–150° C. a lower-alkyl N-(lower-carbalkoxy)-N-R'-anthranilate of the formula

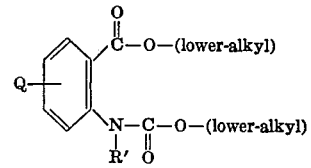

with a hydrazine of the formula R''-NHNH-R''' where R' is hydrogen, lower-alkyl, lower-alkenyl, halo-(lower-alkenyl), phenyl-(lower-alkyl)-, phenyl, phenyl-O—Y—, B N—Y—or B N—COCH₂—where Y is polycarbon-lower-alkylene and B N is piperidino, morpholino, pyrrolidino, piperazino, hexamethyleneimino or lower-alkylated derivatives thereof, R'' and R''' are each hydrogen or lower-alkyl, and Q represents hydrogen or from one to three substituents selected from halo, lower-alkyl, lower-alkoxy, lower-alkylmercapto, lower-alkylsulfonyl, nitro, amino, hydroxy and sulfamoyl.

13. A process according to claim 12 for the preparation of 1-R'-3-R''-4-R'''-3,4-dihydro-1H-Q- 1,3,4-benzotriazepine-2,5-dione where R' is lower-alkyl, and R''=R''' = hydrogen which comprises treating a lower-alkyl N-(lower-carbalkoxy)-N-(lower-alkyl)-Q-anthranilate with hydrazine.

14. A process according to claim 12 for the preparation of 1-R'-3-R''-4-R'''-3,4-dihydro-1H-Q-1,3,4-benzotriazepine-2,5-dione where R' is lower-alkenyl, and R''=R''' = hydrogen which comprises treating a lower-alkyl N-(lower-carbalkoxy)-N-(lower-alkenyl)-Q-anthranilate with hydrazine.

15. A process according to claim 12 for the preparation of 1-R'-3-R''-4-R'''-3,4-dihydro-1H-Q-1,3,4-benzotriazepine-2,5-dione where Q is halo which comprises treating a lower-alkyl N-(lower-carbalkoxy)-N-R'-Q-anthranilate with R''-NHNH-R'''.

16. A process according to claim 12 for the preparation of 1-R'-3-R''-4-R'''-3,4-dihydro-1H-Q-1,3,4-benzotriazepine-2,5-dione where Q is nitro which comprises treating a lower-alkyl N-(lower-carbalkoxy)-N-R'-Q-anthranilate with R''-NHNH-R'''.

17. A process according to claim 12 for the preparation of 1-methyl-3-R''-4-R'''-3,4-dihydro-1H-Q-1,3,4-benzotriazepine-2,5-dione where R''≡R''' = hydrogen which comprises treating a lower-alkyl N-(lower-carbalkoxy)-N-methyl-Q-anthranilate with hydrazine.

18. A process according to claim 12 for the preparation of 1-allyl-3-R''-4-R'''-3,4-dihydro-1H-Q-1,3,4-benzotriazepine-2,5-dione where R''≡R''' = hydrogen which comprises treating a lower-alkyl N-(lower-carbalkoxy)-N-allyl-Q-anthranilate with hydrazine.

19. A process according to claim 12 for the preparation of 1-(2-methyl-2-propenyl)-3-R''-4-R'''-3,4-dihydro-1H-Q-1,3,4-benzotriazepine-2,5-dione where R'' R''' = hydrogen which comprises treating a lower-alkyl N-(lower-carbalkoxy)-N-(2-methyl-2-propenyl)-Q-anthranilate with hydrazine.

20. A process according to claim 12 for the preparation of 1-methyl-3-R''-4-R'''-3,4-dihydro-1H-7-nitro-1,3,4-benzotriazepine-2,5-dione where R''≡R''' = hydrogen which comprises treating a lower-alkyl N-(lower-carbalkoxy)-N-methyl-5-nitroanthranilate with hydrazine.

21. A process according to claim 12 for the preparation of 1-methyl-3-R''-4-R'''-3,4-dihydro-1H-7-chloro-1,3,4-benzotriazepine-2,5-dione where R''≡R''' = hydrogen which comprises treating a lower-alkyl N-(lower-carbalkoxy)-N-methyl-5-chloroanthranilate with hydrazine.

22. A process according to claim 12 for the preparation of 1-methyl-3-R''-4-R'''-3,4-dihydro-17-bromo-1,3,4-benzotriazepine-2,5-dione where R''≡R''' = hydrogen which comprises treating a lower-alkyl N-(lower-carbalkoxy)-N-methyl-5-bromoanthranilate with hydrazine.

Disclaimer 3,607,866.—*Denis M. Bailey*, East Greenbush, N.Y. 3,4-DIHYDRO-1H-1,3,4-BENZOTRIA-ZEPINE-2,5-DIONES AND THEIR PREPARATION. Patent dated Sept. 21, 1971. Disclaimer filed July 17, 1978, by the assignee, *Sterling Drug Inc.*

Hereby enters this disclaimer to claims 1 through 22 of said patent.

[*Official Gazette September 12, 1978.*]